United States Patent
Maimone et al.

(10) Patent No.: US 9,858,721 B2
(45) Date of Patent: Jan. 2, 2018

(54) METHODS, SYSTEMS, AND COMPUTER READABLE MEDIA FOR GENERATING AN AUGMENTED SCENE DISPLAY

(71) Applicant: The University of North Carolina at Chapel Hill, Chapel Hill, NC (US)

(72) Inventors: Andrew Maimone, Durham, NC (US); Henry Fuchs, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 33 days.

(21) Appl. No.: 14/761,229

(22) PCT Filed: Jan. 15, 2014

(86) PCT No.: PCT/US2014/011651
§ 371 (c)(1),
(2) Date: Jul. 15, 2015

(87) PCT Pub. No.: WO2014/113455
PCT Pub. Date: Jul. 24, 2014

(65) Prior Publication Data
US 2015/0363978 A1 Dec. 17, 2015

Related U.S. Application Data

(60) Provisional application No. 61/752,938, filed on Jan. 15, 2013.

(51) Int. Cl.
*G09G 5/00* (2006.01)
*G06T 19/00* (2011.01)
*G02B 27/01* (2006.01)

(52) U.S. Cl.
CPC .......... *G06T 19/006* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 6,483,484 B1 * 11/2002 Yamazaki ................ A61B 5/16
345/8
6,977,705 B1 12/2005 Chiang et al.
(Continued)

FOREIGN PATENT DOCUMENTS

JP 2011-145607 A 7/2011
KR 10-2008-0103407 A 11/2008
(Continued)

OTHER PUBLICATIONS

Commonly-assigned, co-pending U.S. Appl. No. 62/348,838 for "Methods, Systems, and Computer Readable Media for Utilizing Occlusion Masks for Near-Eye Augmented Reality (AR) Displays," (Unpublished, filed Jun. 10, 2016).
(Continued)

*Primary Examiner* — David H Chu
(74) *Attorney, Agent, or Firm* — Jenkins, Wilson, Taylor & Hunt, P.A.

(57) ABSTRACT

The subject matter described herein includes systems, methods, and computer readable media for generating an augmented scene display. An exemplary method includes forming, using a display device operating in a first stage, an augmented virtual image by emitting light rays through a plurality of spatial light modulation layers included in a display device. The method also includes forming, using the display device operating in a second stage, an occluded real image by opening a shutter element of the display device to receive light rays from a real object and utilizing the plurality of spatial light modulation layers to block any light ray from the real object which coincides with the augmented virtual image. The method further includes generating an
(Continued)

augmented scene display that includes both the occluded real image and the augmented virtual image by alternating the operation of the display device between the first stage and the second stage.

29 Claims, 8 Drawing Sheets

(52) U.S. Cl.
    CPC ............... *G02B 2027/0138* (2013.01); *G02B 2027/0178* (2013.01)

(56) References Cited

U.S. PATENT DOCUMENTS

| | | | | |
|---|---|---|---|---|
| 7,639,208 | B1* | 12/2009 | Ha | G02B 27/0172 345/204 |
| 2003/0179464 | A1* | 9/2003 | Amanai | G02B 15/177 359/685 |
| 2004/0108971 | A1* | 6/2004 | Waldern | G02B 27/0093 345/8 |
| 2005/0117016 | A1 | 6/2005 | Surman | |
| 2007/0285346 | A1* | 12/2007 | Li | G02B 27/017 345/8 |
| 2008/0088937 | A1* | 4/2008 | Tang | G02B 27/0172 359/630 |
| 2008/0117289 | A1 | 5/2008 | Schowengerdt et al. | |
| 2010/0118123 | A1 | 5/2010 | Freedman et al. | |
| 2012/0068913 | A1* | 3/2012 | Bar-Zeev | G02B 26/026 345/8 |
| 2012/0119978 | A1 | 5/2012 | Border et al. | |
| 2012/0206452 | A1 | 8/2012 | Geisner et al. | |
| 2012/0235887 | A1 | 9/2012 | Border et al. | |
| 2013/0083173 | A1* | 4/2013 | Geisner | G06F 3/013 348/51 |
| 2013/0162505 | A1 | 6/2013 | Crocco et al. | |
| 2013/0222369 | A1* | 8/2013 | Huston | G06T 17/00 345/419 |
| 2013/0286053 | A1* | 10/2013 | Fleck | G09G 3/3208 345/690 |
| 2014/0168783 | A1* | 6/2014 | Luebke | G02B 27/017 359/630 |
| 2015/0243094 | A1 | 8/2015 | Schowengerdt et al. | |
| 2015/0243099 | A1 | 8/2015 | Schowengerdt | |
| 2015/0248046 | A1 | 9/2015 | Schowengerdt | |
| 2016/0320620 | A1 | 11/2016 | Maimone | |

FOREIGN PATENT DOCUMENTS

| | | |
|---|---|---|
| KR | 10-2009-0052169 A | 5/2009 |
| WO | WO 2014/011266 A2 | 1/2014 |
| WO | WO 2015/095737 A2 | 6/2015 |

OTHER PUBLICATIONS

Yamaguchi et al., "See-through integral imaging display with background occlusion capability," Applied Optics Research Article, vol. 55, No. 3, pp. 1-6 (Jan. 2016).

Notification of Transmittal of the International Search Report and the Written Opinion of the International Searching Authority, or the Declaration for PCT International Patent Application No. PCT/US2014/071556 (Jun. 25, 2015).

"User Interface: This section goes over how Glass presents information, how users interact with it, and how Glass responds to user interaction," Glass Developers—Google Developers, Google Glass, Creative Commons Attribution 3.0 License, https://web.archive.org/web/20140219090943/https://developers.google.com/glass/design/ui/, p. 1-3 (Feb. 18, 2014).

Steptoe, "AR-Rift (Part 1)," William Steptoe, http://willsteptoe.com/post/66968953089/ar-rift-part-1, p. 1-4 (2014).

Trew, "A look at Optinvent's updated Ora smartglasses (hands-on)," Engadget, https://www.engadget.com/2014/03/18/optinvent-updated-ora-hands-on/, p. 1-2, (Mar. 18, 2014).

Travis et al., "Wedge Optics in Flat Panel Displays," Proceedings of the IEEE 101, 1, p. 45-60 (2013).

Lanman et al., "Near-eye light field displays," ACM Trans. Graph. 32, 6 (Nov.), 220:1-220:10 (2013).

Kress et al., "A review of head-mounted displays (HMD) technologies and applications for consumer electronics," In Proc. SPIE, vol. 8720 (2013).

Gao et al., "Optical See-Through Head-Mounted Display with Occlusion Capability." SPIE Defense, Security and Sensing. International Society for Optics and Photonics, pp. 1-9 (2013).

Maimone et al., "Computational augmented reality eyeglasses," Mixed and Augmented Reality (ISMAR), 2013 IEEE International Symposium, p. 29-38 (2013).

"Smart Glasses: A New Way of Seeing the World," Epson—Exceed Your Vision, Epson Moverio BT-300 and BT-200 Smart Glasses—Epson America, Inc. http://www.epson.com/cgi-bin/Store/jsp/Landing/moverio-augmented-reality-smart-glasses.do, p. 1-3 (Nov. 27, 2013).

"A New Architecture," Innovega—the Future of Personal Media, Innovega Inc.—Product—A New Architecture, https://web.archive.org/web/20131129020042/http://innovega-inc.com/new-architecture.php, p. 1-2 (Nov. 29, 2013).

"Taking your vision to the ultimate level," Seeing through, Seeing beyond, a vision ahead, Lumus—A vision ahead, https://web.archive.org/web/20131103193358/http://www.lumus-optical.com/, p. 1-2 (Nov. 3, 2013).

Swirski et al., "Robust real-time pupil tracking in highly off-axis images," Proceedings of ETR, p. 1-4 (2012).

Gao et al., "Occlusion Capable Optical See-Through Head-Mounted Display Using Freeform Optics," IEEE International Symposium on Mixed and Augmented Reality (ISMAr) 2012, pp. 281-282 (Nov. 2012).

Berger et al., "Markerless Motion Capture using multiple Color-Depth Sensors," In proceedings of Vision, Modeling, and Visualization, pp. 1-8 (2011).

Pamplona et al., "Catra: Interactive measuring and modeling of cataracts," ACM SIGGRAPH 2011 Papers, ACM, New York, NY, USA, SIGGRAPH 2011 papers, Article 47, p. 1-9 (2011).

Jurik et al., ". Prototyping a light field display involving direct observation of a video projector array," IEEE International Workshop on Projector-Camera Systems (PROCAMS), p. 15-20 (2011).

Commonly-assigned, co-pending U.S. Appl. No. 61/552,775 for "Methods, Systems, and Computer Readable Media for Reducing Interference Between a Plurality of Structured Light Depth Sensors," (Unpublished, filed Oct. 28, 2011).

Benoit-Pasanau et al., "Minimization of diffraction peaks of spatial light modulators using Voronoi diagrams," Opt. Express 18, 14, p. 15223-15235 (Jul. 1, 2010).

Hiura et al., "Krill-eye: Superposition compound eye for wide-angle imaging via grin lenses," IPSJ Transactions on Computer Vision and Application p. 144-157 (2010).

Pamplona et al., Netra: Interactive measuring and modeling of cataracts. ACM SIGGRAPH 2011 Papers, ACM, New York, NY, USA, SIGGRAPH '11, 47:1-47:8, p. 1-9 (2010).

Joshi et al., "Image Deblurring using Inertial Measurement Sensors," In ACM SIGGRAPH 2010 papers, pp. 1-8 (2010).

Mohan et al., "Imperceptible visual tags for camera based interaction from a distance," ACM SIGGRAPH 2009 Papers, ACM, New York, NY, USA, SIGGRAPH '09, 98:1-98:8, p. 1-8 (2009).

Son et al., "Three-dimensional imaging system based on a light-emitting diode array," Optical Engineering 46(10), p. 103205(1)-103205(4) (2007).

Wang et al., "Optical occlusion in a see-through AR system," International Symposium on Photoelectronic Detection and Imaging: Technology and Applications 2007. International Society for Optics and Photonics, pp. 1-7 (2007).

Zhou et al., "A Novel Optical See-Through Head-Mounted Display with Occlusion and Intensity Matching Support." Technologies for E-Learning and Digital Entertainment. Springer Berlin Heidelberg, pp. 56-62 (2007).

(56) References Cited

OTHER PUBLICATIONS

Levola, "Diffractive optics for virtual displays," In Journal of the Society for Information Display, p. 467-475 (2006).
Feng et al., "Realization of Multilayer Occlusion between Real and Virtual Scenes in Augmented Reality," in Proceedings of the 10th International Conference on Computer Supported Cooperative Work in Design, pp. 1-5 (May 2006).
Brown et al., "Camera-based calibration techniques for seamless multiprojector displays," Visualization and Computer Graphics, IEEE Transactions on 11, 2, p. 193-206 (2005).
Cakmakci et al., "Design of a compact optical see-through head-worn display with mutual occlusion capability," International Society for Optics and Photonics, pp. 1-6 (2005).
Richardson, "Bayesian-Based Iterative Method of Image Restoration," Journal of the Optical Society of America, vol. 62, No. 1, pp. 55-59 (Jan. 1972).
Notification of Transmittal of the International Search Report and the Written Opinion of the International Searching Authority, or the Declaration for International Application No. PCT/US2014/011651 (May 13, 2014).
Maimone et al., "General-Purpose Telepresence with Head-Worn Optical See-Through Displays and Projector-Based Lighting," To appear in: IEEE Virtual Reality, (Mar. 2013).
Wetzstein et al., "Tensor Displays: Compressive Light Field Synthesis using Multilayer Displays with Directional Backlighting," ACM Transactions on Graphics (Proceedings of SIGGRAPH), vol. 31, Issue 4, pp. 1-11, (2012).
Travis et al., "Wedge Optics in Flat Panel Displays," Proceedings of the IEEE, vol. 101, Issue 1, pp. 45-60, (2012).
Hu et al., "Design of an Optical See-Through Multi-Focal-Plane Stereoscopic 3D Display Using Freeform Prisms," Frontiers in Optics Conference, Paper FTh1F.2, Optical Society of America, (2012).
Maimone et al., "Real-Time Volumetric 3D Capture of Room-Sized Scenes for Telepresence," 3DTV Conference: The True Vision—Capture, Transmission and Display of 3D Video (3DTV-CON), (Oct. 2012).
Wetzstein et al., "Lyered 3D: Tomographic Image Synthesis for Attenuation-Based Light Field and High Dynamic Range Displays," ACM Transactions on Graphics, vol. 30, Issue 4, (2011).
Lingley et al., "A Single-Pixel Wireless Contact Lens Display," Journal of Micromechanics and Micro-engineering, vol. 21, Issue 12, p. 125014, (2011).
Lanman et al., "Polarization Fields: Dynamic Light Field Display Using Multi-Layer LCDs," ACM Transactions on Graphics, vol. 30, Issue 6, (2011).
Maimone et al., "A First Look at a Telepresence System with Room-Sized Real-Time 3D Capture and Life-Sized Tracked Display Wall," Artificial Reality and Telexistence (ICAT), 21st International Conference, (Nov. 2011).
Maimone et al., "Encumbrance-Free Telepresence System with Real-Time 3D Capture and Display using Commodity Depth Cameras," 10th IEEE International Symposium on Mixed and Augmented Reality (ISMAR), (Oct. 2011).
Fite-Georgel, "Is There a Reality in Industrial Augmented Reality?" 10th IEEE International Symposium on Mixed and Augmented Reality (ISMAR), pp. 201-210, Science and Technology Proceedings, Switzerland (Oct. 2011).
Cheng et al., "Deisgn of a Wide-Angle, Lightweight Head-Mounted Display Using Free-Form optics Tiling," Optics Letters, vol. 36, Issue 11: pp. 2098-2100, (Jun. 2011).
Lanman et al., "Content-Adaptive Parallax Barriers: Optimizing Dual-Layer 3D Displays using Low-Rank Light Field Factorization," ACM Transactions on Graphics, vol. 29, Issue 6, pp. 163:1-163:10, (2010).
McGuire Jr. et al., "Next-Generation Head-Mounted Display," Proceedings of SPIE 7618, Emerging Liquid Crystal Technologies V, pp. 761804-761804-8, (2010).
Cakmakci et al., "Design of a Free-Form Single-Element Head-Worn Display," Proceedings of the SPIE 7618, Emerging Liquid Crystal Technologies V, pp. 761803-761803-6, (2010).
Gu Ye et al., "A Practical Multi-Viewer Tabletop Autostereoscopic Display," 9th IEEE International Symposium on Mixed and Augmented Reality (ISMAR), pp. 147-156, (Oct. 2010).
Kroeker et al., "Mainstreaming Augmented Reality," Communications of the ACM, vol. 53, Issue 7, pp. 19-21, (Jul. 2010).
Liu et al., "A Novel Prototype for and Optical See-Through Head-Mounted Display with Addressable Focus Cues," Visualization and Computer Graphics, IEEE Transactions, vol. 16, Issue 3, pp. 381-393, (May-Jun. 2010).
Lincoln et al., "Animatronic Shader Lamps Avatars," Proceedings of the 2009 8th IEEE International Symposium on Mixed and Augmented Reality, ISMAR, pp. 27-33, Washington, DC, USA. IEEE Computer Society, (2009).
Lincoln et al., "Multi-View Lenticular Display for Group Teleconferencing," Proceedings of the 2nd International Conference on Immersive Telecommunications, IMMERSCOM, pp. 22:1-22:8, ICST, Brussels, Belgium, Belgium ICST (Institute for Computer Sciences, Social-Informatics and Telecommunications Engineering), (2009).
Nashel et al., "Random Hole Display: A Non-Uniform Barrier Autostereoscopic Display," 3DTV Conference: The True Vision—Capture, Transmission and Display of 3D Video, pp. 1-4, (May 2009).
Santos et al., The Daylight Blocking Optical Stereo See-Through HMD, Proceedings of the 2008 Workshop on Immersive Projection Technologies/Emerging Display Technologies, IPT/EDT, ACM, Article 4, pp. 1-4, New York, USA, (2008).
Hagood et al., 35.5I: "Late-News Paper: A Direct-View Mems Display for Mobile Applications," SID Symposium Digest of Technical Papers, vol. 38, Issue 1, pp. 1278-1281, (2007).
Cakmakci et al., "A Compact Optical See-Through Head-Worn Display with Occlusion Support," Proceedings of the 3rd IEEE and ACM International Symposium on Mixed and Augmented Reality, ISMAR, pp. 16-25, Washington, DC, USA, IEEE Computer Society, (2004).
Kiyokawa et al., "An Occlusion-Capable Optical See-Through Head Mount Display for Supporting Co-located Collaboration," Proceedings of the 2nd IEEE/ACM International Symposium on Mixed and Augmented Reality, ISMAR, pp. 133-141, Washington, DC, USA. IEEE Computer Society, (2003).
Kasai et al., "A Practical See-Through Head Mounted Display Using a Holographic Optical Element," Optical Review, vol. 8, Issue 4, pp. 241-244, (2001).
Fuchs et al., "Augmented reality visualization for laparoscopic surgery," Proceedings of the First International Conference on Medical Image Computing and Computer-Assisted Intervention, pp. 934-943. Springer-Verlag, (1998).
Raskar et al., "The Office of the Future: a Unified Approach to Image-Based Modeling and Spatially Immersive Displays," Proceedings of the 25th Annual Conference on Computer Graphics and Interactive Techniques, SIGGRAPH, pp. 179-188, New York, NY, USA. ACM, (1998).
Feiner et al., "A Touring Machine: Prototyping 3D Mobile Augmented Reality Systems for Exploring the Urban Environment," Proceedings of the 1st IEEE International Symposium on Wearable Computers, ISWC, pp. 74-81, Washington, DC, USA, IEEE Computer Society, (1997).
Daly, "Digital Images and Human Vision. Chapter the Visible Differences Predictor: an Algorithm for the Assessment of Image Fidelity," pp. 179-206. MIT Press, Cambridge, MA, USA, (1993).
Neumann et al., "A Vision of Telepresence for Medical Consultations and Other Applications," Proceedings of the Sixth International Symposium on Robotics Research, pp. 565-571, (Oct. 1993).
Feiner et al., "Knowledge-Based Augmented Reality," Communications of the ACM, vol. 36, Issue 7, pp. 53-62, (Jul. 1993).
Caudell et al., "Augmented Reality: an Application of Heads-up Display Technology to Manual Manufacturing Processes," Systems Sciences, Proceedings of the Twenty-Fifth Hawaii International Conference on, vol. II, pp. 659-669 vol. 2, (Jan. 1992).

(56) References Cited

OTHER PUBLICATIONS

Non-Final Office Action for U.S. Appl. No. 15/423,198 (dated May 19, 2017).
Commonly-assigned, co-pending U.S. Appl. No. 15/423,198 for "Wide Field of View Augmented Reality See Through Head Mountable Display With Distance Accomodation," (Unpublished, filed Feb. 2, 2017).
Lee et al., "Effects of Optical Combiner and IPD Change for Convergence on Near-Field Depth Perception in an Optical See-Through HMD," IEEE Transactions on Visualization and Computer Graphics, vol. 22, No. 5, pp. 1540-1554 (May 2016).
Johnson et al., "Assessing visual discomfort using dynamic lens and monovision displays," 3D Image Acquisition and Display: Technology, Perception and Applications, Optical Society of America, TT4A.1, pp. 1-3 (2016).
Kramida et al., "Resolving the vergence-accommodation conflict in head mounted displays," Department of Computer Science, University of Maryland, pp. 1-17 (2016).
"Microsoft HoloLens—Official Site," Bring ideas to life, Microsoft, http://www.microsoft.com/microsoft-hololens/en-us, pp. 1-11 (Accessed Oct. 3, 2016).
"Augmented Reality—Home," Meta Company, https://www.metavision.com, pp. 1-8 (Accessed Sep. 25, 2016).
"Varioptic—Home—Liquid Lens Solutions, Auto Focus M12 and C-mount lens modules," Varioptic—a Business Unit of Parrot, http://www.varioptic.com/, pp. 1-3 (Accessed Sep. 25, 2016).
"Focus Tunable Lenses—Overview," Optotune, http://www.optotune.com/products/focus-tunable-lenses, Accessed Oct. 3, 2016, pp. 1-2 (2016).
Konrad et al., "Novel optical configurations for virtual reality: Evaluating user preference and performance with foucs-tunable and monovision near-eye displays," Proceedings of the ACM Conference on Human Factors in Computing Systems (CHI16), pp. 1-10 (2016).
Seghir et al., "Extended PDMS stiffness range for flexible systems," Sensors and Actuators A: Physical, 230, pp. 33-39 (2015).
Aksit et al., "Slim near-eye display using pinhole aperture arrays," Applied optics, vol. 54, No. 11, pp. 3422-3427 (2015).
Benko et al., "FoveAR: Combining an optically see-through near-eye display with Spatial Augmented Reality Projections," Proceedings of the 28th Annual ACM Symposium on User Interface Software & Technology, pp. 129-135 (2015).
Kim et al., "Three-dimensional holographic head mounted display using holographic optical element," Consumer Electronics (ICCE), 2015 IEEE International Conference, pp. 132-133 (2015).
Huang et al., "The light field stereoscope: Immersive Computer Graphics via Factored Near-Eye Light Field Displays with Focus Cues," ACM SIGGRAPH Emerging Technologies, pp. 1-12 (2015).
Johnson et al., "Dynamic lens and monovision 3D displays to improve viewer comfort" arXiv preprint arXiv:1512.09163, UC Berkeley—UCSF Graduate Program in Bioengineering, pp. 1-19 (2015).
Maimone et al., "Pinlight displays: wide field of view augmented reality eyeglasses using defocused point light sources," ACM SIGGRAPH 2014 Emerging Technologies Booth 203, ACM, pp. 1-2 (2014).
Hua et al., "A 3d integral imaging optical see-through head-mounted display," Optics express, vol. 22, No. 11, pp. 13484-13491 (May 28, 2014).
Hu et al., "High-resolution optical see-through multi-focul-plane head-mounted display using freeform op-tics," Optics express, vol. 22, No. 11, pp. 13896-13903 (May 30, 2014).
Maimone et al., "Pinlight displays: wide field of view augmented reality eyeglasses using defocused point light sources," ACM Trans. Graph. 33, 4, Article 89, pp. 89:1-89:11 (Jul. 2014).
Lanman et al., "Near-eye light field displays" NVIDIA Research, pp. 1-10 (2013).
Tag Optics Inc., Home—Revolutionizing Adaptive Optics Through Acoustics, http://www.tag-optics.com/, p. 1 (copyright 2012).
Guenter et al., "Foveated 3D Graphics," ACM Trans. Graph. 31 6, Article 164 (TOG), pp. 164:1-164:10 (Nov. 2012).
Carmigniani et al., "Augmented reality technologies, systems and applications," Multimedia Tools and Applications, 51(1), pp. 341-377 (2011).
Yamazaki et al., "Simultaneous self-calibration of a projector and a camera using structured light," In Proc. Projector Camera Systems, pp. 1-8 (2011).
Shibata et al., "The zone of comfort: Predicting visual discomfort with stereo displays," J. Vision 11(8) pp. 1-53 (2011).
Kruijff et al., "Perceptual issues in augmented reality revisited," IEEE International Symposium on Mixed and Augmented Reality, pp. 3-12 (2010).
Liu et al., "An optical see-through head mounted display with addressable focal planes," Mixed and Augmented Reality, ISMAR 2008, 7th IEEE/ACM International Symposium, pp. 33-42 (2008).
Werber et al., "Tunable pneumatic microoptics," Journal of Microelectromechanical Systems, vol. 17, No. 5, pp. 1218-1227 (Oct. 2008).
Hoffman et al., "Vergence-accommodation conflicts hinder visual performance and cause visual fatigue," J. Vision 8(3), pp. 1-48 (2008).
Kiyokawa, "A wide field-of-view head mounted projective display using hyperbolic half-silvered mirrors," Proceedings of the 2007 6th IEEE and ACM International Symposium on Mixed and Augmented Reality, IEEE Computer Society, pp. 1-4 (2007).
Nagahara et al., "Super wide field of view head mounted display using catadioptrical optics," Presence, vol. 15, No. 5, pp. 588-598 (2006).
Wang et al., "Depth-of-focus of the human eye: Theory and clinical implications," Survey of Ophthalmology, vol. 51, No. 1, pp. 75-85 (Feb. 2006).
Bharadwaj et al., "Acceleration characteristics of human ocular accommodation," Vision Research, 45, pp. 17-28 (2005).
Sisodia et al., "Design of an advanced helmet mounted display (ahmd)," Defense and Security, International Society for Optics and Photonics, pp. 304-315 (2005).
Wang et al., "Depth-of-focus of the human eye in the near retinal periphery," Vision Research 44, pp. 1115-1125 (2004).
Dodgson, "Variation and extrema of human interpupillary distance," Electronic imaging 2004, International Society for Optics and Photonics, Proceedings of SPIE, pp. 1-11 (2004).
Kasthurirangan et al., "Amplitude dependent accommodative dynamics in humans," Vision Research, 43(27), pp. 2945-2956 (2003).
Mansell et al., "Deformable mirror development at Stanford University," International Symposium on Optical Science and Technology, Proceedings of SPIE vol. 4493, pp. 1-12 (2002).
Heron et al., "Dynamics of the accommodation response to abrupt changes in target vergence as a function of age," Vision Research, 41(4), pp. 507-519 (2001).
McKay et al., "Membrane-mirror based autostereoscopic display for tele-operation and teleprescence applications," Electronic Imaging, International Society for Optics and Photonics, pp. 198-207 (2000).
Arthur, "Effects of field of view on performance with head-mounted displays," PhD thesis, University of North Carolina at Chapel Hill, 149 pages (2000).
McKay et al., "Membrane Mirror Based Display for Viewing 2D and 3D Images," Electronic Imaging'99, International Society for Optics and Photonics, pp. 144-155 (1999).
Kotulak et al., "The accommodative response to subthreshold blur and to perceptual fading during the Troxler phenomenon," Perception, vol. 15(1), pp. 7-15 (1986).
Ronchi et al., "Depth of focus in peripheral vision," Ophthalmic Res, 7(3), pp. 152-157 (1975).
Phillips et al., "Analysis of accommodative response times using histogram information," American Journal of Optometry & Archives of American Academy of Optometry, 49(5), pp. 389-401 (1972).
Rawson, "Vibrating varifocal mirrors for 3-D imaging," IEEE Spectrum, 6(9), pp. 37-43 (1969).
Spencer et al., "General ray-tracing procedure," JOSA, 52(6), pp. 672-678 (1962).

(56) References Cited

OTHER PUBLICATIONS

Campbell et al., "Dynamics of Accommodation responses of the Human Eye," J. Physiol., 151, pp. 285-295 (1960).
Campbell, "The depth of field of the human eye," Optica Acta: International Journal of Optics, 4(4), pp. 157-164 (1957).
Lippmann, "Epreuves reversible donnant la sensatation du relief,"Comptes-Rendus Academie des Sciences, 146, (translation included), pp. 821-825 (1908).
Lippmann, "Photographie—Epreuves reversible. Photographies integrals," Acdemie des sciences, 146, translation included, pp. 446-451 (1908).

\* cited by examiner

METHODS, SYSTEMS, AND COMPUTER READABLE MEDIA FOR GENERATING AN AUGMENTED SCENE DISPLAY

PRIORITY CLAIM

This application relates and claims priority to U.S. Provisional Patent Application No. 61/752,938, filed on Jan. 15, 2013, the disclosure of which is incorporated herein by reference in its entirety.

TECHNICAL FIELD

The subject matter described herein relates to augmented reality technologies and head-mounted display devices. More particularly, the subject matter described herein relates to methods, systems, and computer readable media for generating an augmented scene display.

BACKGROUND

The utilization of augmented reality (AR) promises to transform graphics from an external entity to an everyday extension of human vision. Twenty years of application development which spans fields such as medicine, manufacturing, maintenance, smart offices, telepresence, and navigation, has shown the promise of AR to greatly benefit society. The advent of high performance and low cost motion and depth sensors, color cameras, and mobile processors has made AR commercially viable. However, despite these advancements, very little use of AR is currently found by the public or industry.

The core problem is believed to be that current displays are too limited to allow most AR applications to be successfully deployed. To support a general array of applications, an AR display should have high image quality, preserve most depth cues, support mutual occlusion between real and virtual objects, and have a wide field-of-view so that objects do not unrealistically disappear and reappear as they come in and out of the display's field-of-view. The display should also be non-encumbering since so that it can be used throughout the day use for hours of daily work and leisure activities. Although it is recognized that a less capable augmented reality display may be appropriate for specialized applications, it is believed that widespread adoption of AR relies on a widely applicable display featuring all of these attributes; however, no such previous device exists.

SUMMARY

The subject matter described herein includes systems, methods, and computer readable media for generating an augmented scene display. In one embodiment, the method includes forming, using a display device operating in a first stage, an augmented virtual image by emitting light rays through a plurality of spatial light modulation layers included in a display device. The method also includes forming, using the display device operating in a second stage, an occluded real image by opening a shutter element of the display device to receive light rays from a real object and utilizing the plurality of spatial light modulation layers to block any light ray from the real object which coincides with the augmented virtual image. The method further includes generating an augmented scene display that includes both the occluded real image and the augmented virtual image by alternating the operation of the display device between the first stage and the second stage.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
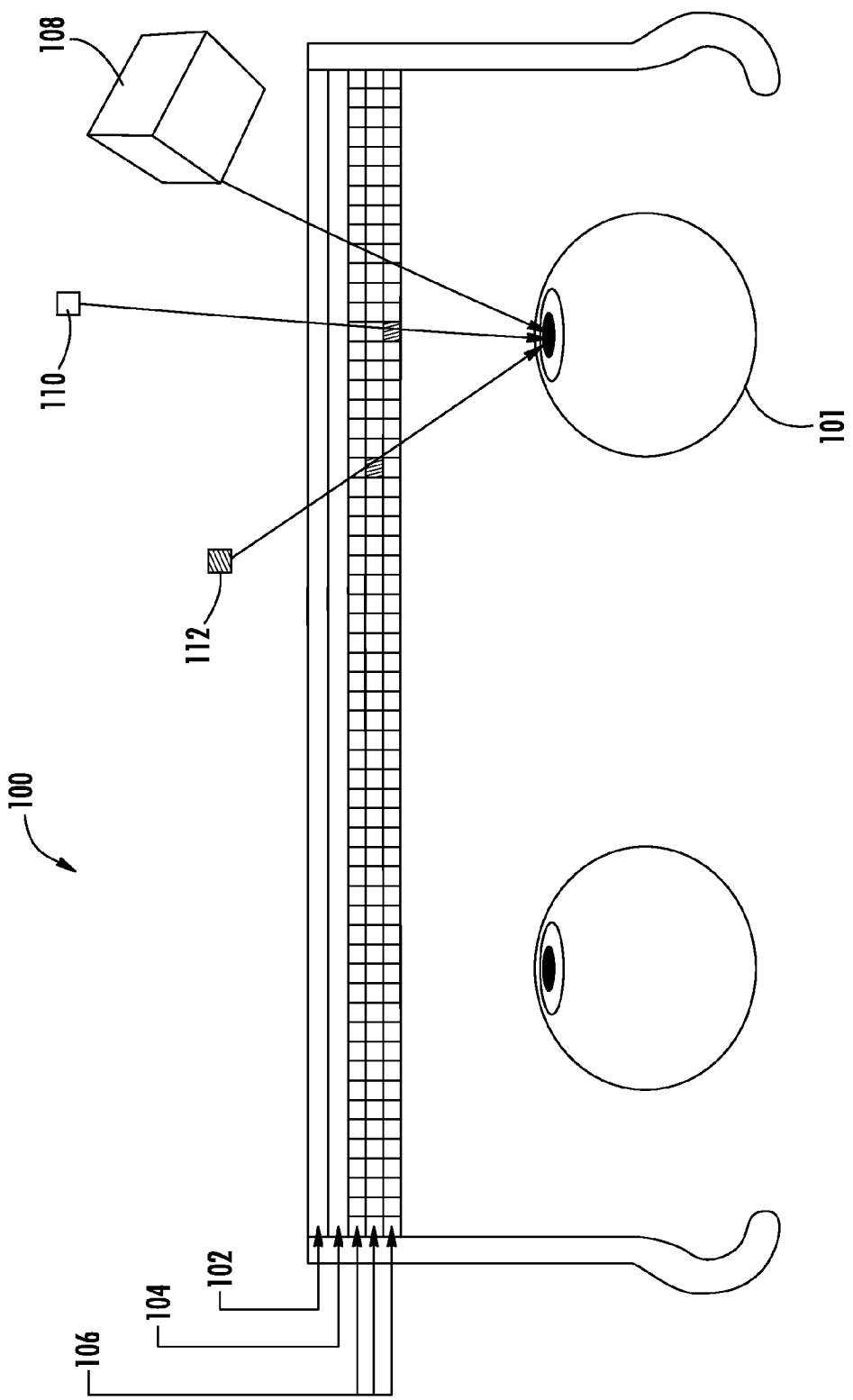
FIG. 1 is an illustration of a top-down view of a compact form factor system configured to generate an augmented scene display according to an embodiment of the subject matter described herein.

The disclosed subject matter introduces a unique approach to optical see-through head mounted display (HMD) design that is based on the emerging field of computational displays—simple optical devices whose functionality and complexity generally lies in software. The disclosed subject matter, which is based on a multi-layer display architecture, may be configured to provide features including a wide field-of-view, focal depth cues, mutual occlusion, and be non-encumbering to the user in order to deliver a high performance optical see-through design in a form factor that approaches ordinary glasses. Such a device may advance the field of augmented reality and allow users to take advantage of the diverse set of applications that have been studied in augmented reality (AR).

Although considerable advances have been made in conventional optical see-through displays, no optical see-through display is currently able to combine a compact form factor, a wide field-of-view, and occlusion support (or even more than one of these qualities) that is needed to support general augmented reality applications. The disclosed subject matter incorporates all of these qualities, as well as multi-focal support, using an alternative computational approach that utilizes stacked light modulation layers.

An emerging class of multi-layer computational displays is able to produce multi-view imagery by displaying patterns on a stack of display layers. When the displays are viewed from different positions, parallax causes different pixels on each layer to align and form the perceived image. The modulation state (e.g. attenuation, polarization, etc.) of each layer is optimized to produce the most numerically accurate images for the desired set of viewpoints. Pattern time-multiplexing over the flicker fusion threshold period can be used to obtain additional degrees of freedom for layer optimization and improve image quality. As used herein, the flicker fusion threshold (or flicker fusion rate) may be defined as the frequency at which an intermittent light stimulus appears to be completely steady to the average human observer.

The disclosed subject matter draws from this approach, while offering several additional features. In some embodiments, the disclosed subject matter may comprise a display device includes at least one of: (i) head-worn and placed close to the eye (rather than a desktop three dimensional (3D) display designed for distance viewing), ii) see-through and modulation layers are used for both virtual image formation and to occlude regions of real objects, and iii) optimization constraints designed to form a focused image over the extent of a viewer's pupil since modulation layers are placed closer than the minimum accommodation distance.

As indicated above, the disclosed subject matter includes a transparent, multi-layer display placed very near (i.e., in close proximity to) the viewer's (or user's) eye. The display layers may be utilized to form virtual imagery and occlude real imagery in a rapidly alternating fashion. Time-multiplexed multi-layer optimization with consideration for the viewer's pupil extent may be utilized to form distant in-focus virtual imagery using layers placed closer than the eye can focus.

The disclosed subject matter may comprise a set of stacked transparent displays placed directly in front of the eyes (e.g., closer than the typical eye accommodation distance) and worn as eyeglasses. To create a focused augmented image, multilayer optimization techniques may be used to avoid the need for conventional optical components, such as lenses and beam splitters. For example, to provide a see-through capability, the displays may be set to a transparent state or may be programmed to selectively occlude parts of the environment.

In some embodiments, the disclosed subject matter may comprise a design including at least a plurality of transmissive spatial light modulators, a backlight element, and a shutter element. For example, the disclosed subject matter may include i) two or more thin and high-speed transmissive spatial light modulators (e.g., transparent LCDs) that control the intensity of passing light through attenuation, ii) a thin and transparent backlight (e.g., a backlight element) that can uniformly distribute rapidly modulated light over the larger face e.g., an edge-lit waveguide or organic light emitting diode (OLED) element, and iii) a thin high-speed shutter (e.g., a shutter element) that can be switched from a globally transparent to a globally opaque state (e.g., a single large liquid crystal cell).

An exemplary arrangement of components is illustrated in FIG. 1. Specifically, FIG. 1 depicts a top-down view of a display device 100 that includes compact form factor resembling eye glasses. Display device 100 may include a shutter element 102, an edge-lit backlight element 104, and a plurality of spatial light modulation layers 106. In a first stage (i.e., a first phase or a first process), shutter element 102 is closed (e.g., made opaque) in a manner that prevents any light rays from real object 108 from being received by device 100 (e.g., viewed by eyes 101). While operating in the first stage, spatial light modulation layers 106 may form an augmented virtual image (e.g., virtual points 110 and 112) by attenuating light rays emitted from backlight element 104. In a second stage (i.e., a second phase or a second process), shutter element 102 opens and permits light from real object 108 to be received and/or viewed. Likewise, spatial light modulation layers 106 may be configured to generate an occluded real image by blocking any light ray from real object 108 that coincides or interferes with the augmented virtual image. In one embodiment, components (e.g., shutter element 102, backlight element 104, and spatial light modulation layers 106) of display device 100 are sandwiched together (e.g., arranged in layers) with spacing between spatial light modulation layers 106.

Figure 2:
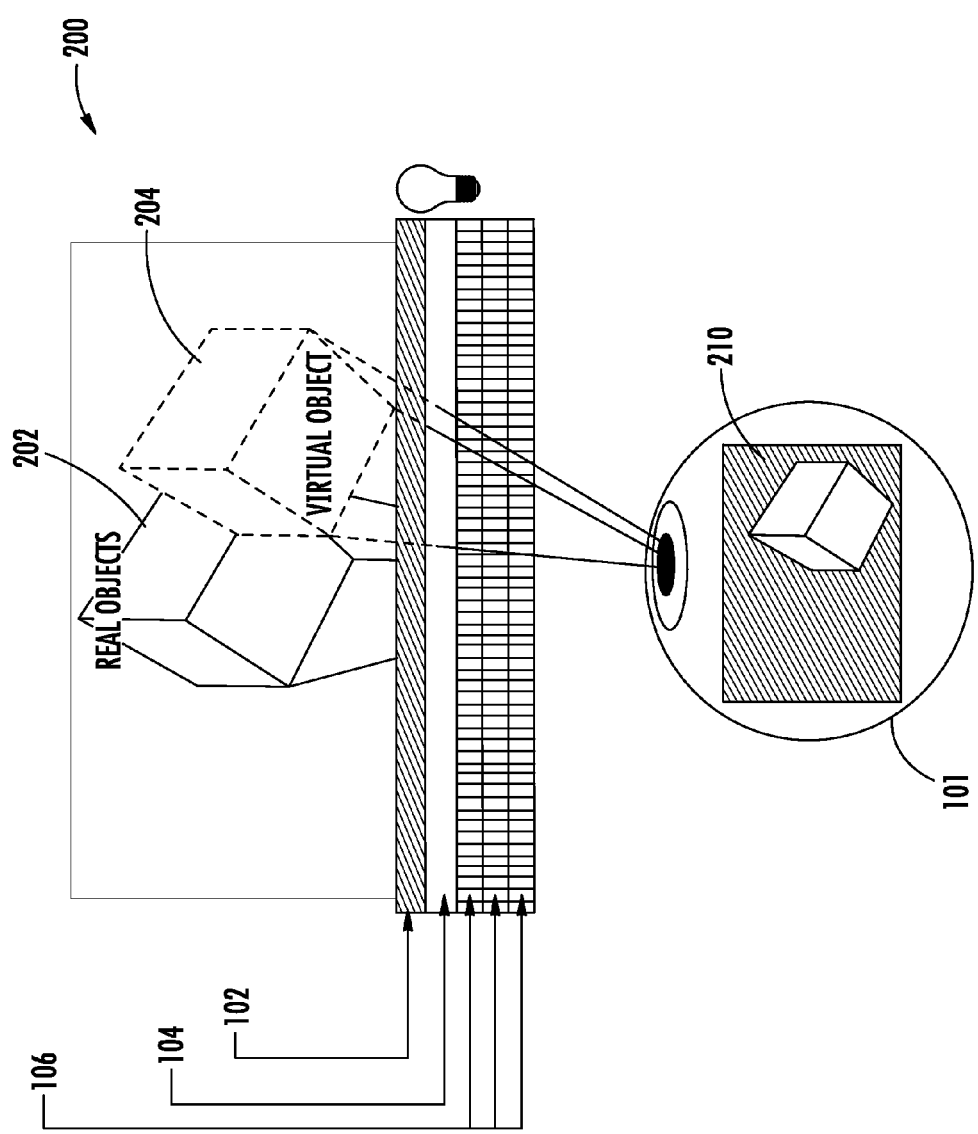
FIG. 2 is an illustration depicting a first stage of an exemplary operating method for generating an augmented scene display according to an embodiment of the subject matter described herein.
Figure 3:
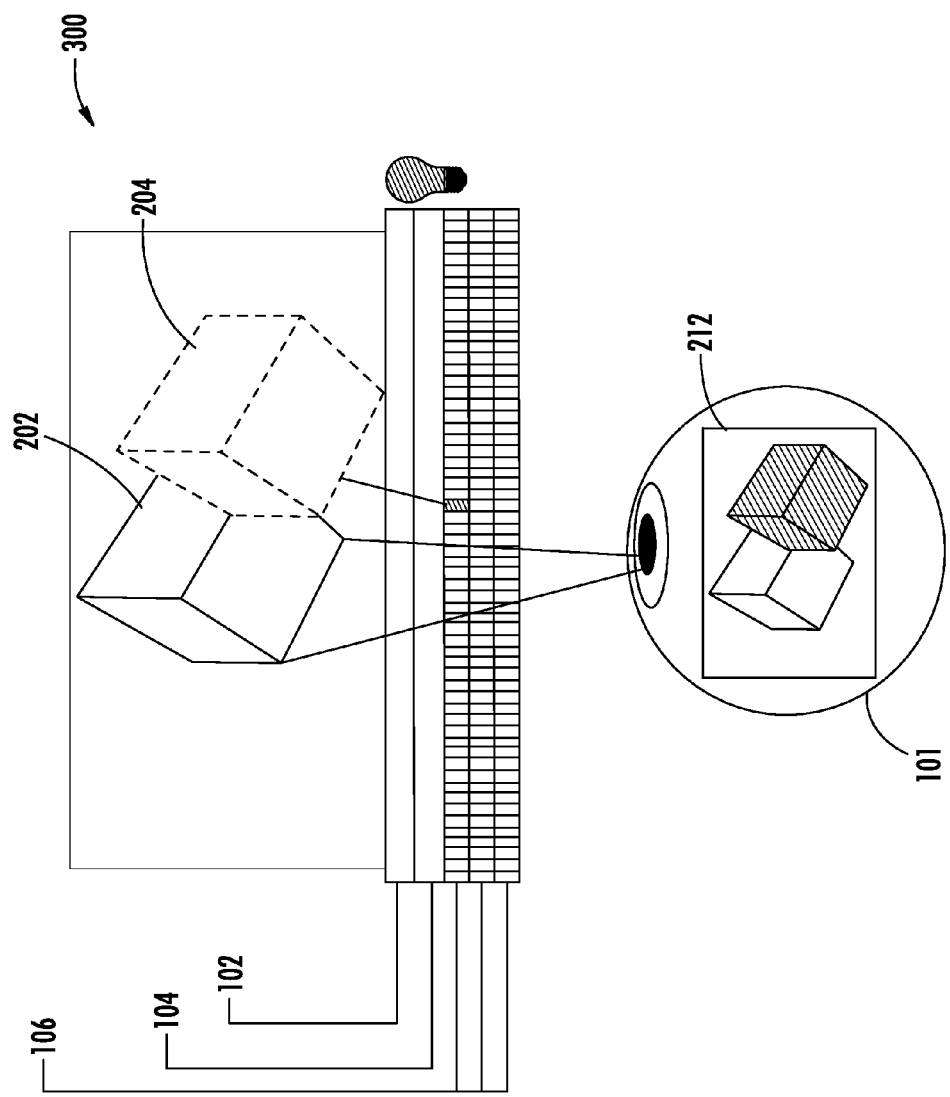
FIG. 3 is an illustration depicting a second stage of an exemplary operating method for generating an augmented scene display according to an embodiment of the subject matter described herein.

As indicated above, the display device operates in two alternating phases or stages, as illustrated in FIGS. 2 and 3. Referring to FIG. 2, in a first stage 200 (e.g., a virtual image formation phase), light from the backlight element 104 passes through patterns displayed on the spatial light modulation layers 106 to form an augmented image over the viewer's pupil (see eye 101) while light from the real scene/object 202 is blocked by shutter element 102. To illustrate, image 210 depicts what is actually viewed by eye 101 in stage 200.

FIG. 3 depicts a second stage 300 (e.g., an occluded real-image formation phase) shutter element 102 is opened and backlight element 104 is disabled. Light from real objects 202 enters the display device and light rays are selectively permitted to reach eye 101 or are blocked by spatial light modulation layers 106. Real image light rays (from real objects 202) are blocked if they coincide with virtual image light rays for virtual objects 204 that are intended to appear opaque. To illustrate, image 212 depicts what is actually viewed by eye 101 in stage 300.

Figure 4:
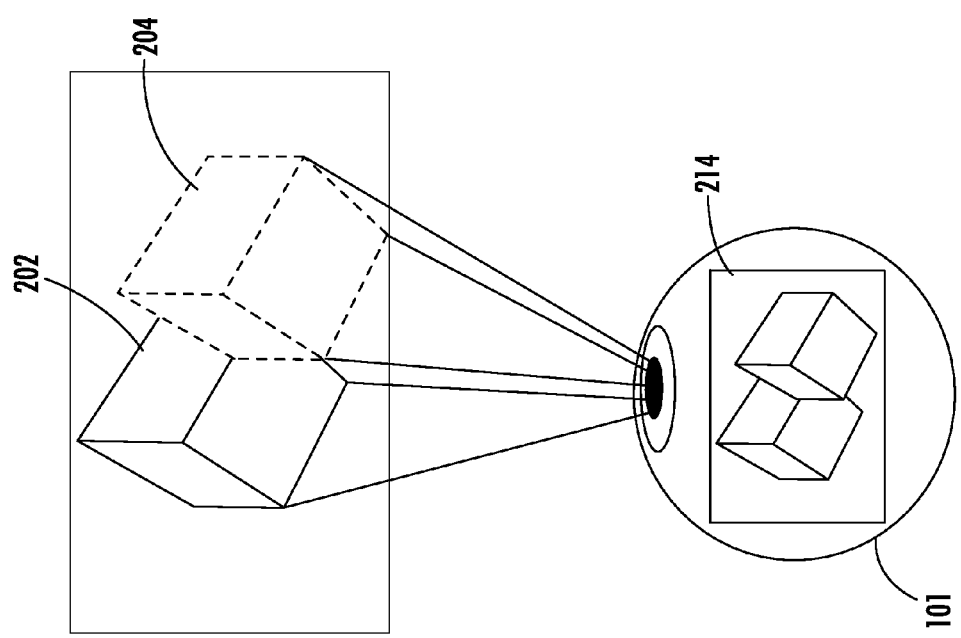
FIG. 4 is an illustration depicting the combination of the first and second stages of an exemplary operating method for generating an augmented scene display according to an embodiment of the subject matter described herein.

FIG. 4 is an illustration depicting the combination of the first stage 200 and second stage 300. For example, these two phases (e.g., stage 200 and stage 300) may be rapidly alternated in sequence beyond the flicker fusion threshold so that the user's eye 101 perceives the resulting union—a perceived augmented scene display 214 that includes a real scene with opaque augmented virtual objects.

In an alternate embodiment, the rearmost spatial light modulation layers and backlight can collectively be replaced with a transparent light emissive display, such as a transparent OLED panel, and the shutter can be replaced with one or more spatial light modulators layers. In this alternative configuration, the rear spatial light modulation layers are used to display occluded real objects at the same time (e.g., simultaneously or contemporaneously) the front spatial light modulation layers and light emissive display are used to form virtual objects, rather than in an alternating fashion as described above. The light emissive display may be controlled to emit light only in display regions corresponding to virtual imagery.

In one embodiment, the disclosed subject matter may include using a display device operating in a first stage (or process) to generate an augmented virtual image by emitting light rays from a transparent light emissive display through a first plurality of spatial light modulation layers included in front of the emissive display. For example, a first set of spatial light modulation layers may be similar as to layers 106 as depicted in FIG. 1 with the exception of the rearmost layer (i.e., furthest away from eyes) of layers 106. In this embodiment, the rearmost layer of layers 106 and backlight element 104 shown in FIG. 1 may be replaced by the light emissive display. The light rays may be emitted by the transparent light emissive display only in display regions corresponding to the augmented virtual image. The display device may also operate in a second stage (or process) that occurs simultaneously or contemporaneously with the first stage (or process). The second stage includes forming an occluded real image by setting to an initial clear state a second plurality of spatial light modulation layers of the display device located behind the light emissive display to receive light rays from a real object. For example, shutter element 102 in FIG. 1 may be replaced by a second set of spatial light modulation layers. Specifically, the second set of spatial light modulation layers may be similar to layers 106 in FIG. 1 but is instead placed in the rear (i.e., away from eyes 101) of the display device and serves as a replacement for shutter element 102 depicted in FIG. 1. The second set of spatial light modulation layers may also be used to block any light ray from the real object which coincides with the augmented virtual image. For example, the second set of spatial light modulation layers may be set clear except where they coincide with virtual objects. The display device may also be configured generate an augmented scene display that includes both the occluded real image and the augmented virtual image by conducting the first stage and the second stage contemporaneously.

In some optical see-through designs, light rays from a two dimensional (2D) image source (e.g. a microdisplay) are redirected by reflection, refraction, and/or diffraction to form a 2D image that appears some distance in front of the viewer. In the disclosed subject matter, the set of all possible light rays (e.g., a white omni-directional area light source) may be filtered using spatial light modulators so that only the light rays that correspond to the desired light field remain. This process is illustrated in FIG. 5.

Figure 5:
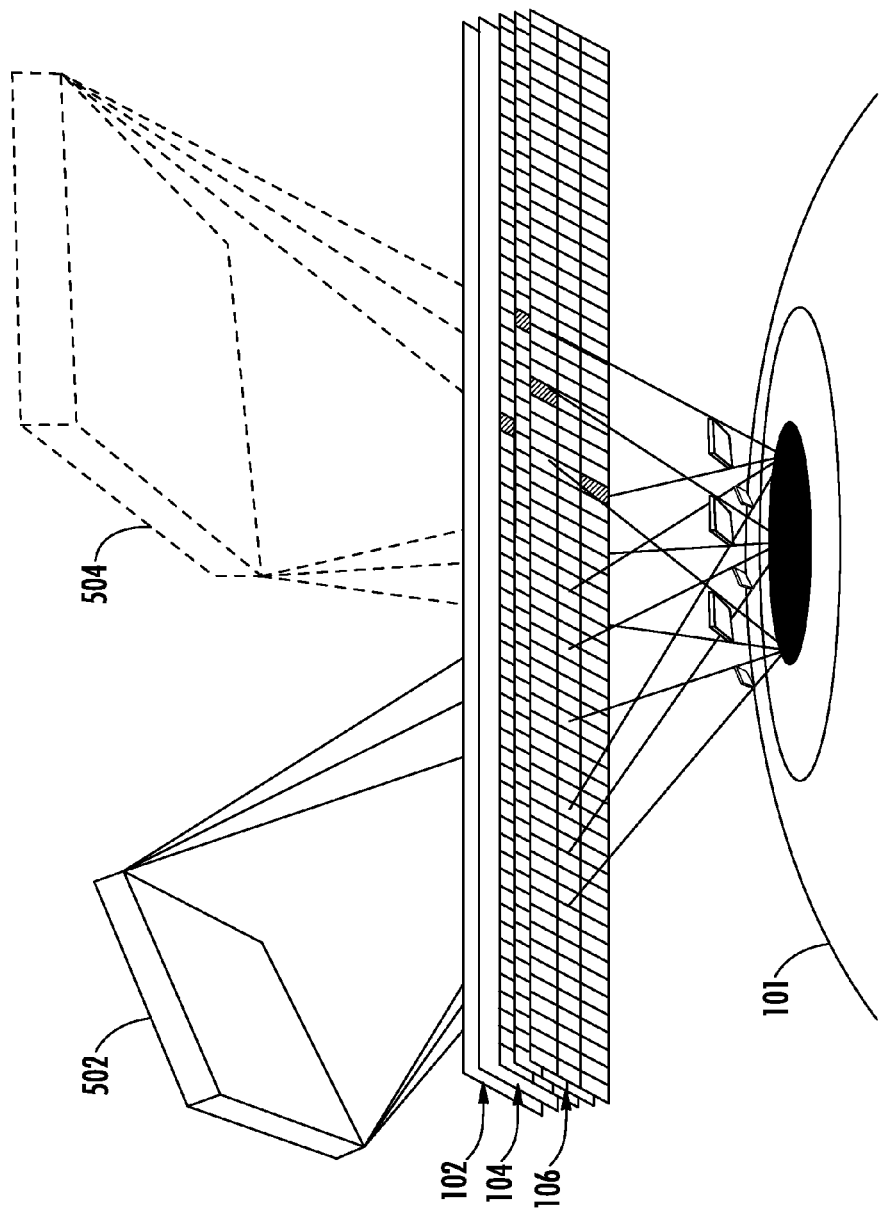
FIG. 5 is an illustration depicting the formation of a virtual image according to an embodiment of the subject matter described herein.

In FIG. 5, each ray emitted by the display begins as a white light ray in the backlight 102 that is attenuated by each of the spatial light modulation layers 106 as the ray travels toward eye 101. The final color of the ray upon entering eye 101 may be the product of the attenuation values assigned to each of the intersected pixels across spatial light modulation layers 106. Thus, to reproduce a virtual image light ray associated with a virtual augmented object 504, the corresponding pixel intensities on each layer may be set so that the product of the pixel intensities equals the desired ray color. In other words, each virtual image ray is reproduced as a white light ray from the backlight that is attenuated across the spatial light modulation layers 106 to produce the final color. The final ray color is the product of the intensities of the intersected pixels across all layers 106. Multiple regions over the pupil are considered when setting the pixel intensities so that a distant focused image may be formed using layers placed very near eye 101. When shutter 102 is open, light rays from real objects 502 may reach eye 101 or be selectively occluded by modulation layers 106.

In one embodiment, the multiplicative constraints placed on each pixel from all intersecting virtual image rays may be considered to determine the attenuation values for each layer. For a non-trivial light field, all constraints may not be satisfied exactly. However, additional degrees of freedom can be obtained by time-multiplexing a set of layer patterns such that the sum of emitted light fields approximates the target light field. This set of patterns may be displayed in rapid sequence beyond the flicker fusion threshold. The disclosed subject matter may utilize a method that addresses this optimization problem by factoring a light field to display on N layers with M time-multiplexed sets of layer patterns into an Nth order, rank M tensor, essentially "compressing" the light field. The approach attempts to minimize the squared error between the desired and emitted light ray intensities, and lower error rates can generally be achieved at the expense of brightness by scaling the original light field by a factor $\beta$. The optimization may be implemented as an iterative algorithm that runs efficiently on a graphics processing unit (GPU).

In some embodiments, the disclosed subject matter may utilize a method for generating an optimized set of time-multiplexed layer patterns for a two layer display. Using a two plane parameterization, the target 4D light field L to emit from such a display can be expressed as the sum of the T time-multiplexed tensor products of the 2D patterns displayed on a backlit pair of attenuation layers f and g (designated herein as Equation 1):

$$L[i, j, k, l] = \sum_{t=1}^{T} f_t[i, j] \otimes g_t[k, l]$$

The N pixels of the 2D pattern for each of the T time-multiplexed patterns can be reordered as a N×T and T×N matrix for f and g respectively. Similarly, the 4D light field L can be reordered as N×N matrix to obtain the equivalent matrix product (designated herein as Equation 2):

$$L = FG$$

The optimal time-multiplexed layer patterns F and G can then be obtained by solving the following optimization problem (designated herein as Equation 3):

$$\underset{F,G}{\mathrm{argmin}} \frac{1}{2} \|\beta L - FG\|_W^2, \text{ for } 0 \leq F, G \leq 1,$$

$$\frac{1}{2}\|\beta L - FG\|_W^2 = \sum_{i \in W, L, FG} [W \circ (L - FG) \circ (L - FG)]_i,$$

where W is a binary valued weight matrix that is used to select which emitted rays should be constrained (i.e. those that intersect the pupil), $\circ$ is the Hadamard (element-wise) product, and $\beta$ is a scaling factor used to trade brightness for image fidelity. Note that L must be decomposed into F and G using non-negative values since elements represent light attenuation values. One exemplary decomposition method may include the following iterative update rules (designated herein as Equation 4):

$$F \leftarrow F \circ \frac{[(W \circ L)G^T]}{[(W \circ (FG))G^T]}, \quad G \leftarrow G \circ \frac{[F^T(W \circ L)]}{[F^T(W \circ (FG))]}$$

Notably, F and G can be initialized with random noise and will converge to a local stationary point (not necessarily the globally optimum). The result of this procedure is that an approximation of the target light field L is "compressed" into to a set of T time-multiplexed pairs of layer patterns F and G. In some embodiments, Tensor Displays may be used to extend the aforementioned formulation to three or more modulation layers and non-uniform backlighting.

The disclosed subject matter further utilizes enhanced multilayer optimization techniques that open the approach to near-eye displays. Unlike existing multilayer designs, the primary objective of the proposed display is to produce a distant and focused augmented image using display layers placed closer than the typical eye accommodation distance. To meet this objective, the display should ideally reproduce the same set of rays that would be emitted from an augmented object as if it were physically present at its apparent location in the scene (see FIG. 5). To produce imagery that appears at focal depths other than the display layers, the eye cannot be treated as a single point. Notably, ray variation over the pupil is to be considered.

Reproducing a light field with sufficient angular resolution to allow ray variation over the pupil is generally difficult for multilayer (and other) displays. It has been demonstrated that a set of modulation layers alone may provide insufficient angular resolution for ray variation over the pupil for a typical desktop display, requiring the addition of a high angular resolution backlight. However, achieving a high angular resolution with the disclosed subject matter is less challenging due to the short eye to display distance. In particular, the theoretical maximum angular resolution (e.g., in terms of the number of possible distinct rays per unit distance at the eye) for a two layer display is (designated herein as Equation 5):

$$r = \frac{d_s}{d_p d_e}$$

where $d_p$ is the pixel pitch, $d_e$ is the display to eye distance, and $d_s$ is the layer separation distance. Since angular resolution is proportional to layer separation $d_s$, display performance will generally improve as the device thickness increases. For a near-eye display, the minimum theoretical view spacing becomes a small multiple $d_e/d_s$ of the pixel pitch, which is typically two orders of magnitude smaller than the size of a human pupil when a high density microdisplay is used. In some scenarios, however, diffraction can reduce the effective angular resolution. Due to this high angular resolution, optimization should be performed with a densely placed set of constraints over the pupil area, up to the maximum angular resolution. Unconstrained areas are undefined, degrading the image when illuminated by a uniform backlight.

In some embodiments, image quality for near-eye display configurations may be improved by converting input light fields to those without local angular variation (e.g., to "planarize" the light field into a set of diffuse planes at varying depths). With this restriction, the reconstructed views are very noisy as before; however, each represents a noisy version of the same image. Therefore, when all views over the pupil are summed (e.g., light is collected by the lens of the eye), much of the noise cancels thereby significantly improving image quality.

In some embodiments, the elimination of local angular variation in the input light field may come at a cost. Namely, objects grouped in the same plane may have the same focal depth, and thus the focal depth cues (e.g., accommodation and retinal blur) will be lost within each grouping. However, it is possible to preserve these focal cues between groups. For example, multiple planar regions may be created over the display such that each appears at their own focal depth. Thus, the ability to create multiple focal depths may reduce the eye fatigue caused by the accommodation-convergence conflict, and may increase the sense of presence of augmented objects, as the augmented objects will have consistency between depth cues that more closely resembles natural objects. There is no performance penalty for creating multiple planar regions at different depths if the regions share no ray constraints (i.e., the regions do not overlap over the circle of confusion of the pupil area), a common case for sparse augmented overlays.

Although restricting light fields to diffuse planes for noise cancellation significantly improves image quality, the results may not be ideal. One alternative to improve image fidelity for near-eye display configurations may involve optimization of the perceived image rather than attempt to reconstruct the original light field. To form an image, light rays enter the eye, are refracted by the lens, and strike the retina. For a given eye focal state, the individual intensities of the rays falling on a spot on the retina are not important, but rather their perceived sum. However, preserving individual ray intensities can place additional constraints on the optimization. By constraining groups of rays only by their sum of intensities, there may be more freedom to meet other constraints. In some embodiments, this retinal optimization process may comprise a software algorithm included in a software module executed by a hardware processor (e.g., see FIG. 8 below). As used the present disclosure, the terms "function" or "module" refer to hardware, firmware, or software in combination with hardware and/or firmware for implementing features described herein.

In some embodiments, performing this retinal optimization can require knowledge of the focal state of the eye. For example, it may be necessary to know the state of the eye's lens to determine where rays will fall on the retina. Rather than attempt to measure this focal state, an assumption is made that image quality is most important when an object is in focus. Thus, in some embodiments, optimization is performed as if the eye is simultaneously focused on each object in the scene, thereby improving in focus performance at the expense of out-of-focus blur quality.

In some embodiments, retinal optimization may be performed by replacing the reconstructed light field matrix FG, which is computed during each iteration of the rules specified in previously presented Equation 4, with a matrix R described below. Matrix R replaces the reconstructed intensity of each ray with the average intensity of the set of rays falling on the same retinal spot. For example, matrix R is computed according to:

---

Algorithm 1 Compute Retinal Reconstruction R for each (x, y) ∈ E do
　　S = RetinaRays(x, y)
　　$t = \frac{1}{|S|} \sum_{(i,j) \in S} (FG)[i, j]$
　　for each (i, j) ∈ S do
　　　　R[i, j] = t
　　end for
end for where E represents the set of unique spots on the retina and RetinaRays(x, y) returns the set of rays that fall on retinal spot (x, y). In some embodiments, conventional optimization can be performed prior to retinal optimization in order to provide a reasonable initial solution.

In some embodiments, perceptual optimization (rather than least squares optimization) for multilayer displays may be utilized. In some embodiments, the disclosed perceptual optimization process may comprise a software algorithm included in a software module executed by a hardware processor (e.g., see FIG. 8 below). For example, a simple perceptual optimization scheme that relies on the conventional optimization formulation may be utilized through the use of the existing ray weighting mechanism. In some embodiments, a weight matrix W (see Equation 4) was binary-valued and used to select which of the set of all possible rays emitted by the display should be constrained. As an alternative, the use of a real-valued matrix W, in which a zero value indicates an unconstrained ray and a non-zero value in the range (0 . . . 1] indicates the perceptual importance of the ray, may be used. In some embodiments, the importance and/or weight of each ray may be mapped to a variety of factors, such as i) a perceptual metric (e.g., contrast with adjacent rays), ii) object importance, and/or iii) the distance from the center of the field of view.

As described above, the disclosed subject matter may be designed to emit a light field to each eye, rather than a 2D image. The variation over the pupil provided by a light field allows creation of virtual objects with correct focal cues (accommodation and retinal blur) that more closely resemble naturally observed objects.

In some embodiments, modulation layers can be purposed both to form augmented images and provide an occluded view of the real environment. Formation of a real image occlusion mask over the display layers follows the same description that was provided for virtual images above, except that i) the light sources are rays emitted from the real environment, rather than a backlight and ii) the target light field for optimization consists of all rays of full intensity (thus allowing rays from the environment to pass through unchanged), except those that coincide with the occlusion mask. Occlusion masks are also specified as light fields and are optimized into sets of time-multiplexed layer patterns so that the occlusion masks appear in focus and at the correct focal depth. In addition, occlusion masks may be used to block real light rays behind augmented objects so that the augmented objects appear opaque. In this scenario, the occlusion mask light field may be a copy of the augmented image light field where object pixels are assigned an intensity value of 0 (opaque) and are therefore fully blocked by the attenuation layers, whereas all other pixels are assigned an intensity value of 1 (transparent). Likewise, object pixels may also be assigned non-zero values for partial transparency. An example occlusion mask is presented in image 610 in FIG. 6.

Support for eye movement may be conducted via two approaches. The first approach includes the formulation of ray constraints. Notably, when formulating ray constraints for layer optimization, not only is the extent of the pupil considered, but also the space of possible movement of the pupil while looking through the display. The approach requires more constraints on the system and may reduce image quality. However, the weighting tensor can be used to prioritize more common forward-looking eye positions. To obtain the neutral position of each eye, facial measurements could be input to the system, or the user could interactively adjust the expected eye position until a set of patterns appear aligned across the display layers.

The second approach includes locating the position of the eyes using a camera or other tracking device. This approach requires more hardware complexity, but requires fewer constraints on the layer optimization. One possible tracking approach is to place a miniature camera on the edge of the backlight waveguide that can see through the display through total internal reflection. This approach can also be used in conjunction with the ray prioritization described above so that quality is optimized in the foveal region at the expense of reduced quality in the periphery.

Figure 6:
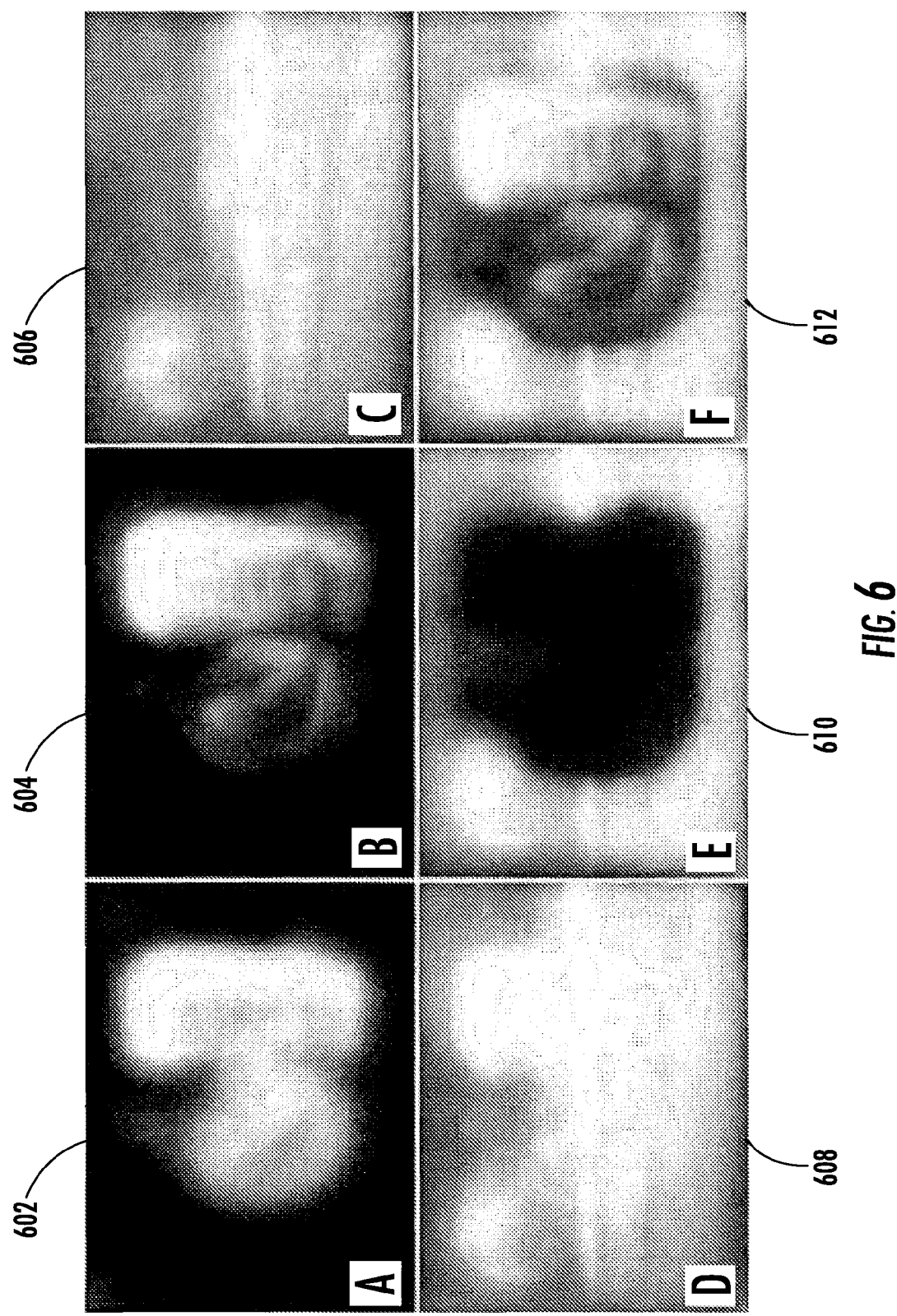
FIG. 6 is an illustration depicting exemplary results for a generated augmented scene display according to an embodiment of the subject matter described herein.

FIG. 6 is an illustration depicting the steps for generating an exemplary augmented scene display according to an embodiment of the subject matter described herein. Notably, FIG. 6 demonstrates the merger of real and virtual objects with mutual occlusion. For example, image 602 in FIG. 6 depicts a virtual image naively displayed on the farthest layer (e.g., rear LCD layer). Image 604 depicts a virtual image generated by a series of optimized time-multiplexed patterns.

Image 604 was taken with the backlight turned on and a black mask placed behind the display to simulate a rear shutter. The virtual objects in image 604 were optimized into an eight (8) time-multiplexed frame sequence using a brightness scaling factor of $\beta=0.4$. Image 606 in FIG. 6 depicts a photograph of the real environment with an optimized occlusion mask displayed on the device. Image 608 depicts the time-multiplexed virtual objects from image 604 combined with the real objects from image 606. Notably, the resulting combination depicted in image 608 simulates an augmented scene without occlusion support.

As shown in FIG. 6, image 610 depicts an image of the real objects in the real environment overlaid with an optimized occlusion mask representing the virtual objects. Lastly, image 612 of FIG. 6 depicts the combination of images 604 and 610 to simulate an augmented scene with occlusion support. Notably, the virtual objects properly occlude the real objects in image 612, i.e., the disclosed subject matter is able to produce mutual occlusion between real and virtual objects.

Figure 7:
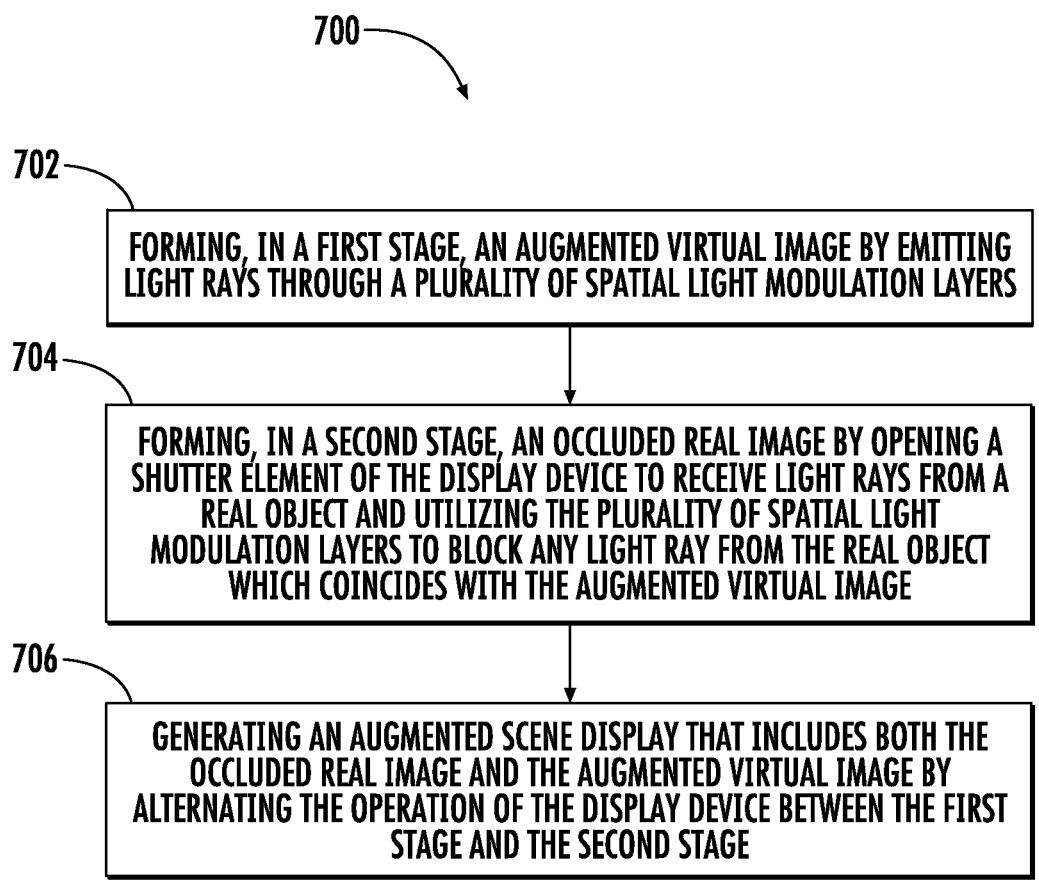
FIG. 7 is a diagram illustrating an exemplary method for generating an augmented scene display according to an embodiment of the subject matter described herein.

FIG. 7 is a diagram illustrating an exemplary method 700 for generating an augmented scene display according to an embodiment of the subject matter described herein. In step 702, a display device operating in a first stage is used to form an augmented virtual image. In some embodiments, the augmented virtual image may be formed by the display device by emitting light rays through a plurality of spatial light modulation layers included in the display device.

In step 704, the display device operates in a second stage and forms an occluded real image. In some embodiments, the occlude real image is formed by the display device opening a shutter element (of the display device) to receive light rays from a real object and utilizing the plurality of spatial light modulation layers to block any light ray from the real object which coincides with the augmented virtual image (formed in step 702).

In step 706, an augmented scene display is generated. In one embodiment, the display device generates an augmented scene display that includes both the occluded real image and the augmented virtual image by alternating the operation of the display device between the first stage and the second stage (e.g., rapidly switching between the images formed in first and second stages).

Figure 8:
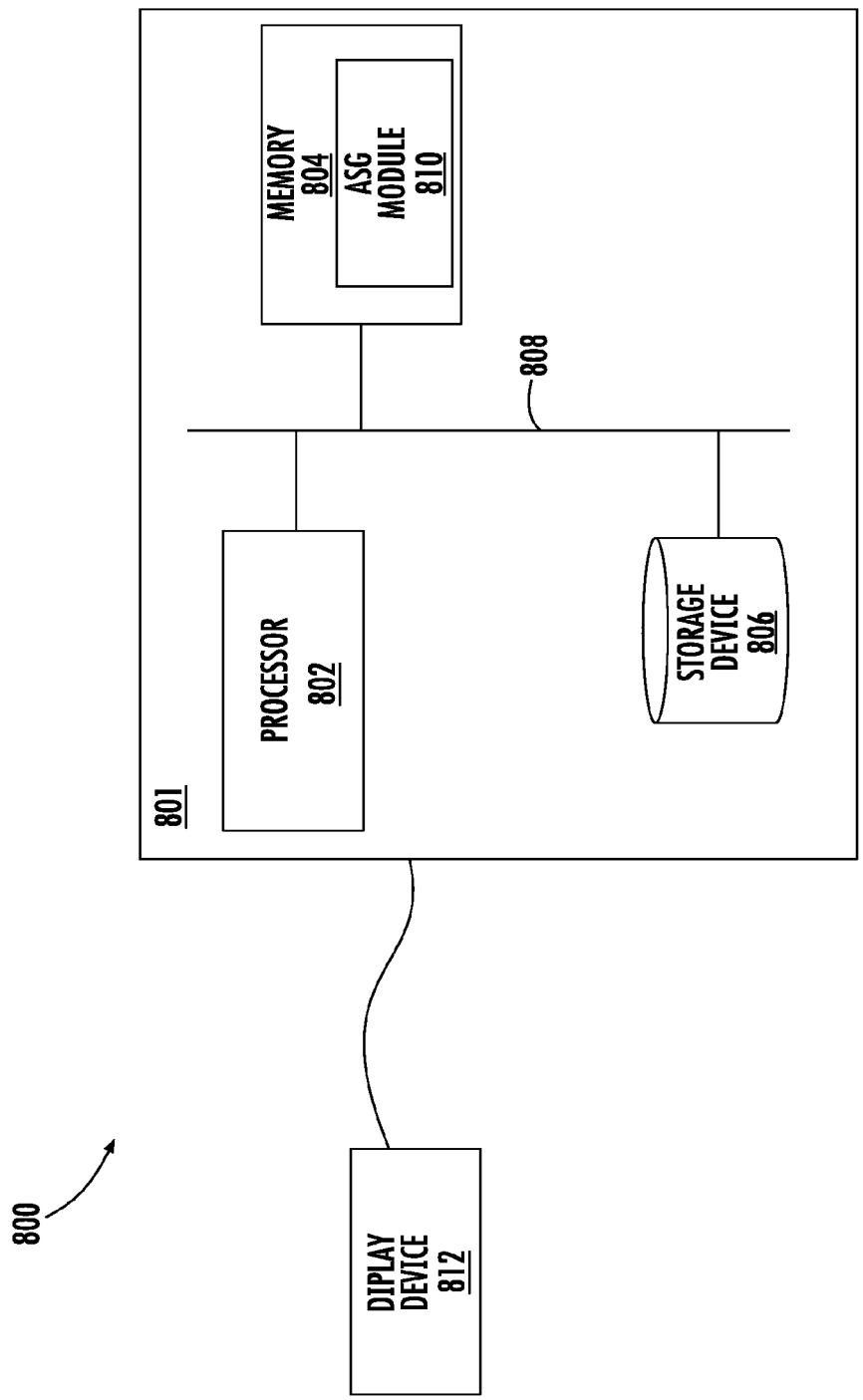
FIG. 8 is an illustration of a high level block diagram of an exemplary general purpose computer system suitable for use in performing the functions described herein.

FIG. 8 depicts a high level block diagram of a general purpose computer system 800 suitable for use in performing the functions described herein. As depicted in FIG. 8, system 800 includes a computer platform unit 801 (e.g., a device containing driving electronics) and a display device 812. In some embodiments, computer platform unit 801 includes a processor 802, a memory 804, and a storage device 806 communicatively connected via a system bus 808. In some embodiments, processor 802 can include a microprocessor, central processing unit (CPU), or any other like hardware based processing unit. In some embodiments, an augmented reality display generation module 810 can be stored in memory 804, which can include random access memory (RAM), read only memory (ROM), optical read/write memory, cache memory, magnetic read/write memory, flash memory, or any other non-transitory computer readable medium. In some embodiments, module 810 may be utilized to perform any of the aforementioned algorithms, methods, processes, and/or optimizations indicated above (e.g., multilayer optimization, retinal optimization, perceptual optimization, method 700, etc.) In some embodiments, processor 802 and memory 804 can be used to execute and manage the operation of module 810. In some embodiments, storage device 806 can include any storage medium or storage unit that is configured to store data accessible by processor 802 via system bus 808. Exemplary storage devices can include one or more local databases hosted by system 800.

In some embodiments, display device 812 may include optical-see through glasses with a wide field of view and occlusion support. For example, display device 812 may include a form factor similar to eyeglasses, goggles, or any other like compact head mounted display. In some embodiments, display device 812 may be communicatively connected, either wired (as shown in FIG. 8) or wirelessly, to unit 801. In some embodiments, unit 801 can be configured to provide the processing resources and driving electronics to generate the augmented reality scenes to be displayed by device 812.

In some embodiments, the subject matter includes a method for generating an augmented scene display that comprises i) forming, using a near-eye display device operating in a first stage, an augmented virtual image by emitting light rays through a plurality of spatial light modulation layers included in the display device, ii) forming, using the near-eye display device operating in a second stage, an occluded real image, and generating an augmented scene display that includes both the occluded real image and the augmented virtual image by alternating the operation of the near-eye display device between the first stage and the second stage. Notably, although an exemplary method for generating an occluded real image is described above, the occluded real image may be generated by another method and/or means without departing from the scope of the disclosed subject matter.

In some embodiments, the subject matter includes a method for generating an augmented scene display that comprises i) forming, using a near-eye display device operating in a first stage, an augmented virtual image, ii) forming, using the near-eye display device operating in a second stage, an occluded real image by opening a shutter element of the near-eye display device to receive light rays from a real object and utilizing a plurality of spatial light modulation layers included in the near-eye display device to block any light ray from a real object which coincides with the augmented virtual image, and iii) generating an augmented scene display that includes both the occluded real image and the augmented virtual image by alternating the operation of the near-eye display device between the first stage and the second stage. Notably, although an exemplary method for generating an augmented virtual image is described above, the augmented virtual image may be generated by another method and/or means without departing from the scope of the disclosed subject matter.

In some embodiments, the subject matter includes a method for generating an augmented scene display that comprises i) forming, using a display device operating in a first stage, an augmented virtual image by emitting light rays through a plurality of spatial light modulation layers included in the display device and ii) forming, using the display device operating in a second stage, an occluded real image by opening a shutter element of the display device to receive light rays from a real object and utilizing the plurality of spatial light modulation layers to block any light ray from the real object which coincides with the augmented virtual image. The method further includes generating an augmented scene display that includes both the occluded real image and the augmented virtual image by alternating the operation of the display device between the first stage and the second stage.

In some embodiments of the method described above, the generated augmented virtual image is optimized with respect to the sum of the intensities associated with each of the light rays that falls on a specific retinal area of an eye viewing into the display device (i.e. with respect to the perceived image). This is in contrast to optimizing with respect to the individual intensity associated with each of the light rays emitted by the display device.

In some embodiments of the method described above, the augmented virtual image is generated by prioritizing each of the light rays by their importance. In one embodiment, the level of importance is assigned based on a perceptual metric, importance of the object, and/or a distance from a designated center of a field of view.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for generating an augmented scene display, the method comprising:
    forming, using a display device operating in a first stage, an augmented virtual image by emitting light rays through a plurality of spatial light modulation layers included in the display device;
    forming, using the display device operating in a second stage, an occluded real image by opening a shutter element of the display device to receive light rays from a real object and utilizing the plurality of spatial light modulation layers to block any light ray from the real object which coincides with the augmented virtual image; and
    generating an augmented scene display that includes both the occluded real image and the augmented virtual image by alternating the operation of the display device between the first stage and the second stage.

2. The method of claim 1 wherein the plurality of spatial light modulation layers includes a plurality of transparent liquid crystal displays (LCDs).

3. The method of claim 1 wherein the display device includes a head-worn device.

4. The method of claim 1 wherein the plurality of spatial light modulation layers is configured to attenuate the emitted light rays.

5. The method of claim 1 wherein the emitted light rays used to form an augmented virtual image are generated by a backlight element included in the display device.

6. The method of claim 5 wherein the first stage includes a virtual image formation phase wherein the light rays are emitted from a backlight element in the display device and passes through patterns displayed on the plurality of spatial light modulation layers to form the augmented virtual image while the light rays from the real object are blocked by the shutter element.

7. The method of claim 6 wherein the second stage includes an occluded real-image formation phase wherein the shutter element is opened and a backlight element in the display device is disabled.

8. The method of claim 1 wherein the shutter element is configured to be switched from a globally opaque state in the first stage to a globally transparent state in the second stage.

9. The method of claim 8 wherein the shutter element includes a single liquid crystal cell.

10. The method of claim 5 wherein the backlight includes a transparent organic light emitting diode (OLED) panel.

11. The method of claim 1 wherein the first stage and second state are alternated beyond a flicker fusion threshold.

12. The method of claim 1 wherein the plurality of spatial light modulation layers are constrained to allow a focused image to be formed on an eye or a camera when the display device is positioned closer than the focal distance of the eye or the camera.

13. A system for generating an augmented scene display, the system comprising:
    a display device that includes:
    a backlight element configured to emit light rays in a first stage;
    a shutter element configured to open and allow light rays from a real object to be received by the display device in a second stage; and
    a plurality of spatial light modulation layers configured to form, in the first stage, an augmented virtual image by receiving and attenuating the emitted light rays and to form, in the second stage, an occluded real object image by blocking any light ray from the real object that coincides with the augmented virtual image, and to generate an augmented scene display that includes both the occluded real image and the augmented virtual image by alternating between the first stage and the second stage.

14. The system of claim 13 wherein the plurality of spatial light modulation layers includes a plurality of transparent liquid crystal displays (LCDs).

15. The system of claim 13 wherein the display device includes a head-worn device.

16. The system of claim 13 wherein the emitted light rays used to form an augmented virtual image are generated by the backlight element.

17. The system of claim 16 wherein the first stage includes a virtual image formation phase wherein the light rays emitted from the backlight element pass through patterns displayed on the plurality of spatial light modulation layers to form the augmented virtual image while the light rays from the real object are blocked by the shutter element.

18. The system of claim 17 wherein the second stage includes an occluded real-image formation phase wherein the shutter element is opened and the backlight element is disabled.

19. The system of claim 13 wherein the shutter element is configured to be switched from a globally opaque state in the first stage to a globally transparent state in the second stage.

20. The system of claim 19 wherein the shutter element includes a single liquid crystal cell.

21. The system of claim 13 wherein the backlight includes a transparent organic light emitting diode (OLED) panel.

22. The system of claim 13 wherein the first stage and second state are alternated beyond a flicker fusion threshold.

23. The system of claim 13 wherein the plurality of spatial light modulation layers are constrained to allow a focused image to be formed on an eye or a camera when the display device is positioned closer than the focal distance of the eye or the camera.

24. A method for generating an augmented scene display, the method comprising:
    forming, using a display device operating in a first stage, an augmented virtual image by emitting light rays from a transparent light emissive display through a first plurality of spatial light modulation layers included in front of the transparent light emissive display, wherein the light rays are emitted by the transparent light emissive display only in display regions corresponding to the augmented virtual image;
    forming, using the display device operating in a second stage, an occluded real image by setting to an initial clear state a second plurality of spatial light modulation layers of the display device located behind the transparent light emissive display to receive light rays from a real object and utilizing at least one of the second plurality of spatial light modulation layers to block any light ray from the real object which coincides with the augmented virtual image; and
    generating an augmented scene display that includes both the occluded real image and the augmented virtual image by conducting the first stage and the second stage contemporaneously.

25. The method of claim 24 wherein the transparent light emissive display includes a transparent organic light emitting diode (OLED) panel.

26. A system for generating an augmented scene display, the system comprising:
    a display device that includes:
    a transparent light emissive display configured to emit light rays in a first stage;
    a first plurality of spatial light modulation layers configured to form, in the first stage, an augmented virtual image by receiving and attenuating the emitted light rays;
    a second plurality of spatial light modulation layers configured to, in a second stage, an initial clear state to allow light rays from a real object to be received by the display device in a second stage and to form an occluded real object image by blocking any light ray from the real object that coincides with the augmented virtual image; and
    wherein the display device generates an augmented scene display that includes both the occluded real image and the augmented virtual image by conducting the first stage and the second stage contemporaneously.

27. The system of claim 26 wherein the transparent light emissive display includes a transparent organic light emitting diode (OLED) panel.

28. A non-transitory computer readable medium having stored thereon executable instructions that when executed by the processor of a computer control the computer to perform steps comprising:
    forming, using a display device operating in a first stage, an augmented virtual image by emitting light rays through a plurality of spatial light modulation layers included in the display device;

forming, using the display device operating in a second stage, an occluded real image by opening a shutter element of the display device to receive light rays from a real object and utilizing the plurality of spatial light modulation layers to block any light ray from the real object which coincides with the augmented virtual image; and generating an augmented scene display that includes both the occluded real image and the augmented virtual image by alternating the operation of the display device between the first stage and the second stage.

29. A non-transitory computer readable medium having stored thereon executable instructions that when executed by the processor of a computer control the computer to perform steps comprising:

forming, using a display device operating in a first stage, an augmented virtual image by emitting light rays from a transparent light emissive display through a first plurality of spatial light modulation layers included in front of the transparent light emissive display, wherein the light rays are emitted by the transparent light emissive display only in display regions corresponding to the augmented virtual image;

forming, using the display device operating in a second stage, an occluded real image by setting to an initial clear state a second plurality of spatial light modulation layers of the display device located behind the transparent light emissive display to receive light rays from a real object and utilizing at least one of the second plurality of spatial light modulation layers to block any light ray from the real object which coincides with the augmented virtual image; and generating an augmented scene display that includes both the occluded real image and the augmented virtual image by conducting the first stage and the second stage contemporaneously.

* * * * *